J. A. WILHELM.
SIGNAL APPARATUS FOR MOTOR VEHICLES.
APPLICATION FILED MAY 22, 1914.
1,142,650.
Patented June 8, 1915.
3 SHEETS—SHEET 1.
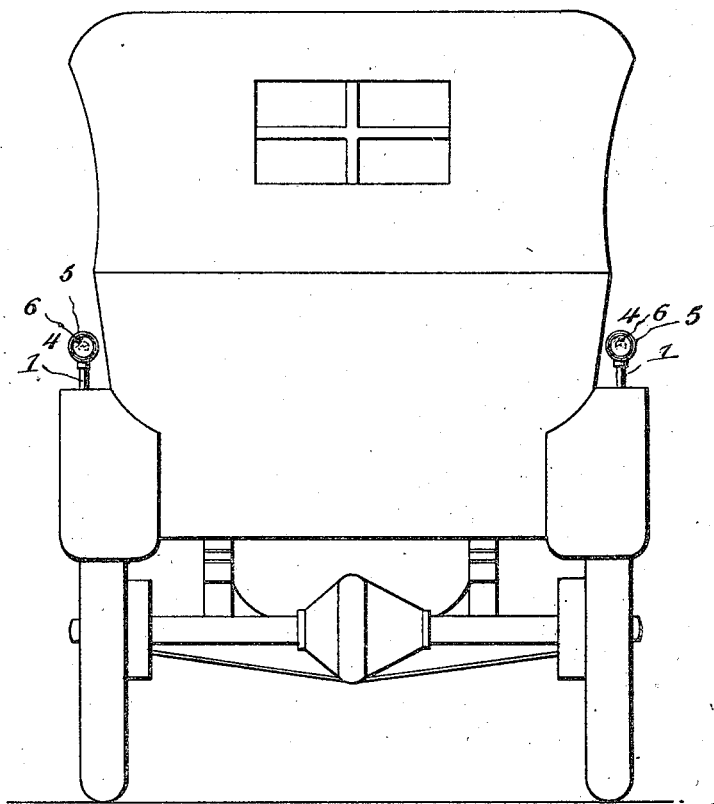
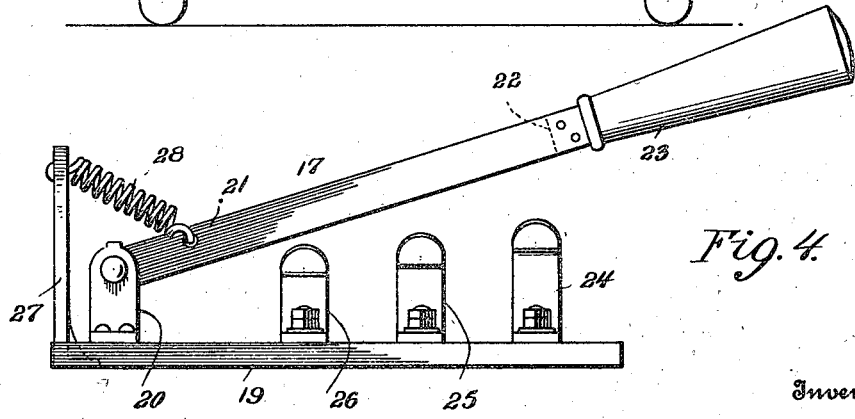

J. A. WILHELM.
SIGNAL APPARATUS FOR MOTOR VEHICLES.
APPLICATION FILED MAY 22, 1914.
1,142,650.
Patented June 8, 1915.
3 SHEETS—SHEET 2.
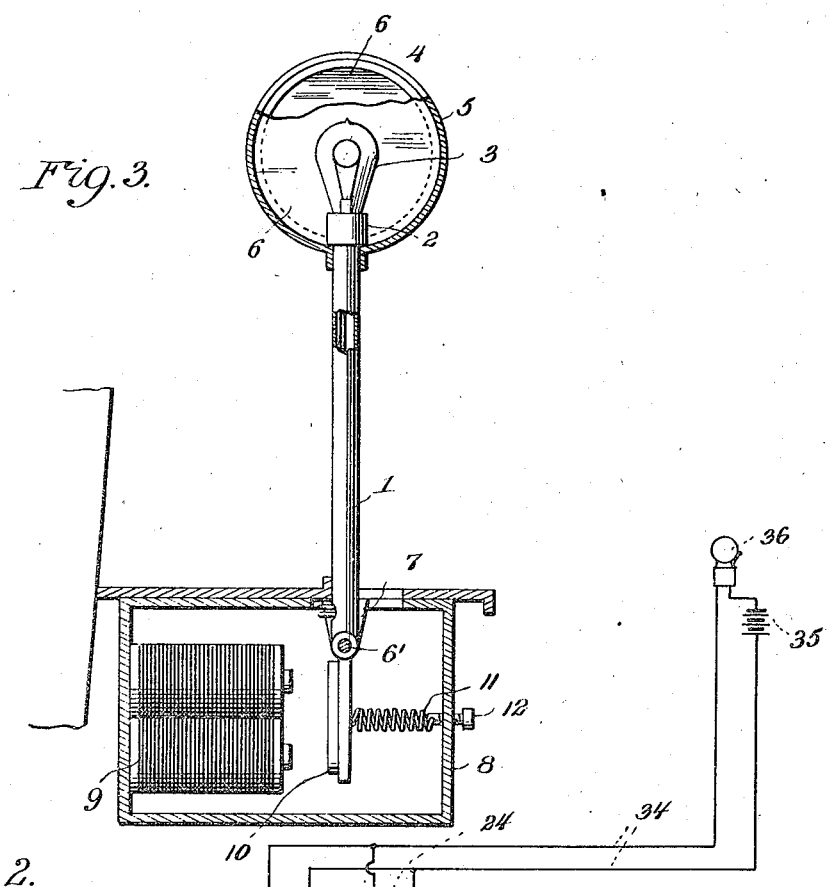
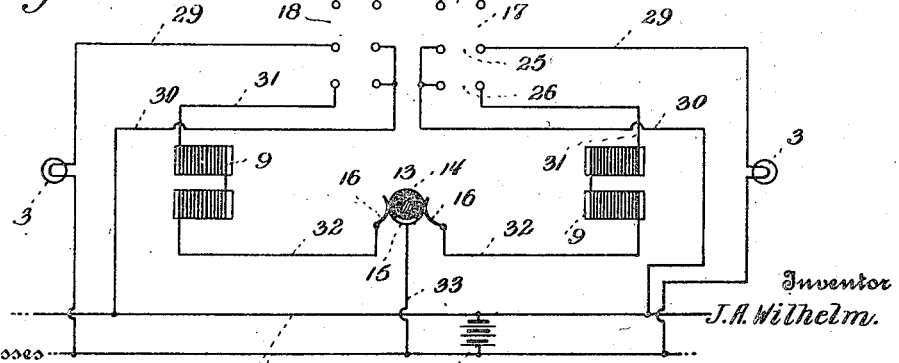

J. A. WILHELM.
SIGNAL APPARATUS FOR MOTOR VEHICLES.
APPLICATION FILED MAY 22, 1914.
1,142,650.
Patented June 8, 1915.
3 SHEETS—SHEET 3.
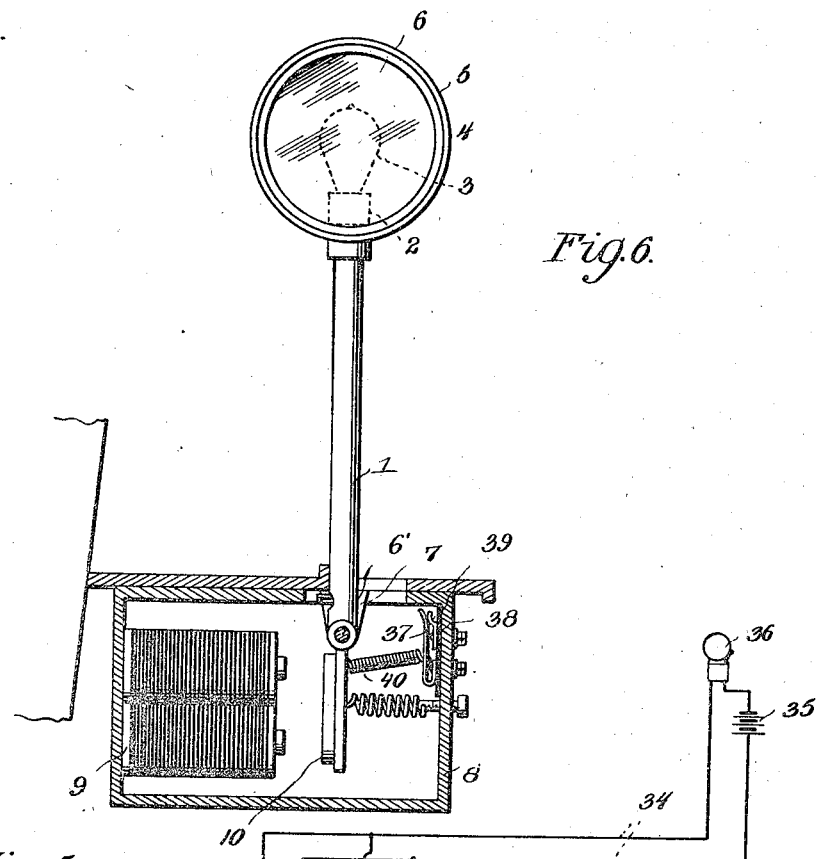
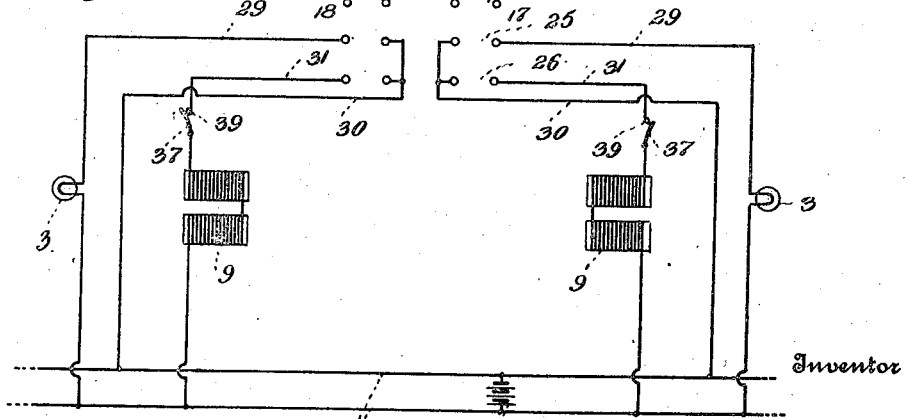
Witnesses
W. R. Smith
John J. McCarthy
Inventor
J. A. Wilhelm.
By Victor J. Evans
Attorney

UNITED STATES PATENT OFFICE.

JACOB A. WILHELM, OF DETROIT, MICHIGAN.

SIGNAL APPARATUS FOR MOTOR-VEHICLES.

1,142,650.  Specification of Letters Patent.  Patented June 8, 1915.

Application filed May 22, 1914. Serial No. 840,280.

*To all whom it may concern:*

Be it known that I, JACOB A. WILHELM, a citizen of the United States, residing at Detroit, in the county of Wayne and State of Michigan, have invented new and useful Improvements in Signal Apparatus for Motor-Vehicles, of which the following is a specification.

This invention relates to improvements in signal apparatus for motor vehicles and has particular application to a signal apparatus for indicating the movements of the vehicle.

In carrying out the present invention, it is my purpose to provide a signal apparatus of the class described whereby the chauffeur or operator of a motor vehicle may notify the operator of a vehicle at the rear of the movements of his vehicle so that such rear operator may act accordingly.

It is also my purpose to provide a signal apparatus for motor vehicles which will embody among other features a signal arm normally held stationary and capable of vibration so as to insure the transmitting of the signal and means for vibrating said arm and under the control of the driver or operator of the vehicle so that the arm may be vibrated whenever necessary.

Furthermore, I aim to provide an apparatus of the type set forth which will embrace the desired features of simplicity, efficiency and durability, one which may be installed and maintained at a minimum expense and one which will be reliable in operation.

With the above and other objects in view, the invention consists in the construction, combination and arrangement of parts hereinafter set forth in and falling within the scope of the claims.

In the accompanying drawings; Figure 1 is a rear elevation of a motor vehicle equipped with a signal apparatus constructed in accordance with the present invention. Fig. 2 is a diagrammatic view of the circuits of the apparatus. Fig. 3 is a fragmentary sectional view through the motor vehicle showing the connections between the signal arm and the vehicle and the operating means for the signal arm. Fig. 4 is a view in side elevation of one of the switches. Fig. 5 is a diagrammatic view of the electric circuits of a modified form of the invention. Fig. 6 is an enlarged fragmentary sectional view through the motor vehicle showing the construction of the vibrating mechanism for the arm illustrated in Fig. 5.

Referring now to the drawings in detail, 1, 1 indicate vertical arms each in the form of a hollow tube having the upper end thereof equipped with a socket 2 receiving an electric lamp bulb 3. Also fastened to the upper end of each arm 1 is a casing 4 inclosing the bulb 3 and embodying a cylindrical band 5 carrying bull's eyes or lenses 6 colored red and disposed upon the opposite sides of the lamp 3.

In the present instance, the lower ends of the arms 1 are pivoted upon horizontal pins 6' carried by brackets 7, 7 secured to the upper surfaces of the rear fenders or mud guards of the vehicle, the lower ends of such arms projecting through the fenders. Arranged in proximity to the lower end of each arm and fastened to the under side of the fender adjacent to the outer edge thereof is a box or casing 8 within which are mounted electromagnets 9 having the windings thereof connected in series and the pole faces arranged adjacent to the lower end of the arm 1. Secured to the lower end of the arm 1 and arranged within the influence of the poles of the magnets 9 is an armature 10, while connected to the lower end of the arm is a coiled contractile spring 11 having the free end connected to an adjusting screw 12 fastened to one wall of the box 8, the spring serving to maintain the respective arm normally in vertical position.

13 designates a circuit interrupter comprising, in the present instance, a disk 14 constructed of insulating material and keyed upon the crank shaft of the engine and having a metal conducting segment 15 embedded in the periphery thereof. In engagement with the periphery of the disk 14 and disposed at opposite sides thereof are brushes 16, 16. Mounted upon the dash board of the vehicle within convenient reach of the operator are two switches 17, 18 each comprising a base 19 in the form of a vertical slab having pivot ears 20 projecting outwardly therefrom adjacent to the upper end thereof. Pivotally mounted within the ears 20 are blades 21 spaced apart in parallelism and having the outer ends thereof connected through the medium of a cross piece 22 provided with a handle 23 of insulating material. Extending outwardly from the base 19 below the pivot ears 20 and increasing in length progressively are pairs of contacts 24, 25 and 26, while secured to the upper edge of the base is a lug 27 having secured thereto one end of a coiled contractile spring 28, the free end of the latter being fastened to the blades 21 of the switch and acting to hold the blades normally out of engagement with the contacts 24, 25 and 26.

The numeral 27' designates a suitable source of electrical energy such, for instance, as a battery and connected to the opposite sides of such battery are lead wires 28'. In the present instance, the switch 17 is designed to control the illumination of the lamp 3 and the magnets 9 upon the left hand side of the vehicle, looking at the latter from the front, while the switch 18 controls the illumination of the lamp 3 and the energization of the magnets 9 upon the right hand side of the vehicle and leading from one contact 25 of each pair is a conductor 29 extending through the respective lamp 3 and tapped onto one of the lead wires 28, while leading from the remaining contact of each pair is a conductor 30 connected with the other lead wire 28'. Leading from one contact of each pair 26 is a conductor 31 extending through the windings of the respective magnets 9, while connected to the other side of the windings of such magnets is a conductor 32 connected with one brush 16 of the circuit closer 13 and electrically connected with the segment 15 on the disk of the circuit closer is a conductor 33 connected with the lead wire 28' opposite that connected with the conductors 30. The remaining contact of each pair 26 is connected with the adjacent conductor 30.

The numeral 34 designates an electric circuit including a source of electrical energy as a battery 35 and an audible signal as a bell 36 and the pairs of contacts 24 of the switches 17 and 18 are connected in parallel with the circuit 34 so that when one or the other pair of contacts 24 is bridged the circuit 34 will be closed and the signal 36 sounded.

In practice, should the driver of the vehicle desire to turn to the left the switch blades 21 of the switch 18 are actuated to bridge the various pairs of contacts 24, 25 and 26 whereby the circuit 34 is closed and the bell 36 sounded, the lamp 3 energized and the magnets 9 energized. Upon the energization of the magnets 9 the armature 10 is drawn into engagement with the pole faces thereof against the action of the spring 11 thereby swinging the respective arm 1 to a diagonal position. As the circuit interrupter 13 is connected with the engine of the vehicle and connected in series with the magnets 9, such magnets will be alternately energized and deënergized whereby the armature 10 will be alternately retracted and released with the effect to vibrate the arm 1 so as to attract the attention of the driver of a vehicle in the rear. On the contrary, when the driver of the vehicle wishes to turn to the right, the switch 17 is actuated whereby the bell 36 is again energized, and the lamp 3 at the left hand side of the vehicle (looking at the vehicle from the front) energized, and the magnets 9 alternately energized and deënergized as previously described with respect to the other set of magnets 9, so that the signal arm 1 under the control of the switch 17 is actuated as previously described with reference to the signal arm under the control of the switch 18.

When the driver of the vehicle wishes to bring his vehicle to a stop, both switches are actuated to circuit closing position simultaneously thereby energizing both lamps and causing both arms to vibrate.

In the modified construction illustrated in Fig. 5, I have shown each set of magnets 9 as provided with an individual circuit interrupter, each interrupter comprising an arm 37 capable of swinging movement and mounted upon a base 38 arranged within the box 8, and a spring contact finger 39 normally engaged by the arm 37. In this form of my invention, the finger 39 is connected to the end of the respective conductor 31, while the arm 37 is connected with the windings of the magnets 9, the conductors 32 of the sets of magnets being connected directly to the lead wire 28' opposite from that to which the conductors 30 are fastened. Each arm 37 is fastened to the lower end of the adjacent signal arm 1 through the medium of a spring 40. By means of this construction, it will be seen that the circuit interrupters are connected in series with the sets of magnets and are normally in circuit closing position. Thus, when one set of magnets is energized the respective armature 10 is drawn into engagement with the pole faces thereof so as to swing the signal arm 1 and in the swinging movement of the signal arm the spring 40 is placed under tension so as to break the circuit at the contact finger 39 thereby deënergizing the magnet and permitting the spring 11 to react to restore the arm to normal position, this alternating opening and closing of the circuit and energization of the magnets taking place as long as the respective switch is closed thereby keeping the signal arm in motion.

From the foregoing description taken in connection with the accompanying drawings, the construction, mode of operation and manner of employing my invention will be readily apparent. It will be seen that I have provided a motor vehicle signal apparatus whereby the operator of the vehicle may advise the operators of vehicles at the rear of the manner in which he is about to control his vehicle.

While I have herein shown and described certain preferred forms of my invention by way of illustration, I wish it to be understood that I do not limit or confine myself to the precise details of construction herein described and delineated, as modification and variation may be made within the scope of the claims without departing from the spirit of the invention.

I claim:

1. In motor vehicle signal apparatus, the combination with the fender of the vehicle having a transverse slot therein, of a box secured to the under surface of said fender and having a slot formed in the top wall thereof registering with the first slot, a signal arm pivoted within said slots and projecting upwardly through the slots and having the lower end thereof disposed within said box, an electromagnet in said box, and an armature secured to the lower end of said arm within said box and disposed within the influence of said magnet whereby the arm will be swung upon the energization of the magnet.

2. In motor vehicle signal apparatus, the combination with the fender of the vehicle having a transverse slot therein, of a box secured to the under surface of said fender and having a slot formed in the top wall thereof registering with the first slot, a signal arm pivoted within said slots and projecting upwardly through the slots and having the lower end thereof disposed within said box, an electromagnet in said box, an armature secured to the lower end of said arm within said box and disposed within the influence of said magnet whereby the arm will be swung upon the energization of the magnet, and a spring having one end connected to said armature and the opposite end connected to said box and acting to restore the arm to normal position succeeding the deënergization of the magnet.

3. In motor vehicle signal apparatus, the combination with the fender of the vehicle having a transverse slot therein, of a box secured to the under surface of said fender and having a slot formed in the top wall thereof registering with the first slot, a signal arm pivoted within said slots and projecting upwardly through the slots and having the lower end thereof disposed within said box, an electromagnet in said box, an armature secured to the lower end of said arm within said box and disposed within the influence of said magnet whereby the arm will be swung upon the energization of the magnet, a spring having one end connected to said armature and the opposite end connected to said box and acting to restore the arm to normal position succeeding the deënergization of the magnet, an electric circuit including said magnet, and means in said circuit for alternately opening and closing the latter whereby said arm will be vibrated under the action of the magnet and the spring.

In testimony whereof I affix my signature in presence of two witnesses.

JACOB A. WILHELM.

Witnesses:
 MAXWELL S. FRIEDLAND,
 C. H. BILLARTS.